US007693960B1

(12) United States Patent
Harman

(10) Patent No.: US 7,693,960 B1
(45) Date of Patent: Apr. 6, 2010

(54) ASYNCHRONOUS DATA STORAGE SYSTEM WITH GEOGRAPHIC DIVERSITY

(75) Inventor: Audrey D. Harman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1798 days.

(21) Appl. No.: 10/691,004

(22) Filed: Oct. 22, 2003

(51) Int. Cl.
*G06F 15/16* (2006.01)

(52) U.S. Cl. .................. 709/218; 709/217; 709/231; 709/233

(58) Field of Classification Search .............. 709/212, 709/217–219, 230–231, 233
See application file for complete search history.

(56) References Cited

U.S. PATENT DOCUMENTS

| | | | | |
|---|---|---|---|---|
| 2003/0014523 | A1* | 1/2003 | Teloh et al. ............ | 709/226 |
| 2003/0115204 | A1* | 6/2003 | Greenblatt et al. ...... | 707/10 |
| 2004/0139168 | A1* | 7/2004 | Tanaka et al. .......... | 709/213 |
| 2004/0233910 | A1* | 11/2004 | Chen et al. ............ | 370/395.5 |

OTHER PUBLICATIONS

Cisco Systems. Cisco MDS 9000 Series Multilayer Switches. Oct. 2003.*
Hitachi Data Systems. Sprint, Cisco, Hitachi Data Systems Team to Achieve Data Storage Breakthrough—Press Release. Jul. 2003.*
Anidi et al., Storage area networking—an introduction and future development trends, Oct. 2002, BT Technology Journal, vol. 20 No. 4, pp. 45-60.*
Ed Frauenheim; "Tech Allies Demo Storage at a Distance;" CNET News.com; Jul. 8, 2003; 2 pages; http://www.news.com/Tech+allies+demo+storage+at+a+distance/2100-1035_3-1023989.html.
Tim McElligott; "Sprint Raises Bar for IP Data Replication;" Telephony Online; Jul. 14, 2003; 3 pages; http://telephonyonline.com/backoffice/print/telecom_sprint_raises_bar/.
Christina Torode; "Sprint, Cisco, Hitachi Testing Data Replication Over IP Networks;"0 CRN.com; Jul. 8, 2003; 1 page; http://www.crn.com/networking/18839526.
Jo Maitland; "Sprint Stretches Storage Over IP;" ByteandSwitch.com; Jul. 7, 2003; 2 pages; http://www.byteandswitch.com/document.asp?doc_id=36606.

* cited by examiner

*Primary Examiner*—Shawki S Ismail
*Assistant Examiner*—Grant Ford

(57) ABSTRACT

A data storage system comprises a first storage system, a second storage system, and a third storage system. The first storage system receives individual data files from a customer system, and on an individual file-by-file basis substantially in real time from receiving each of the individual data files, determines individual file types for the individual data files and transfers the individual data files based on the individual file types over a bonded time division multiplex connection. The second storage system receives and stores the individual data files on the individual file-by-file basis, and subsequently forms blocks of data including the individual data files, and transfers the blocks of data over an internet protocol connection. The third storage system receives and stores the blocks of data.

20 Claims, 4 Drawing Sheets

ASYNCHRONOUS DATA STORAGE SYSTEM WITH GEOGRAPHIC DIVERSITY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of data storage, and in particular, to asynchronous data storage that is geographically diverse.

2. Description of the Prior Art

FIG. 1 illustrates data storage system 100 in an example of the prior art. Data storage system 100 includes customer system 101, Network Attached Storage (NAS) system 102, and local storage system 103. Customer system 101 and NAS system 102 are located at customer premises 104. Customer system 101 transfers data files to NAS system 102 over communication link 111. NAS system 102 transfers the data files to local storage system 103 over communication link 112, where local storage system 103 stores the data files. Customer system 101 and local storage system 103 each maintain a version of the data files, so two versions of the data files are maintained at different locations.

Communication links 111-112 could use various communication protocols, such as Small Computer System Interface (SCSI), Fibre Channel (FC), Internet Protocol (IP), and Ethernet.

NAS system 102 handles the receipt and transfer of files on an individual file-by-file basis in real time. Thus, NAS system 102 provides asynchronous data file transfer by transfer a data file when it is ready for transfer, as opposed to transferring the data file later on in a scheduled block transfer. NAS system 102 determines the file type of each data file, and the transfer of the data file is carried out based on the specific file type of the individual data file.

Customer system 101 executes a database application, such as those supplied by Oracle, IBM, and Microsoft. Both the database application and the file type place a severe latency restriction on data file transfer. This latency restriction effectively restricts the distance between NAS system 102 and local storage system 103 to approximately 20 miles.

Unfortunately, the government may mandate that some data files, such as those containing important financial data, be stored at separate locations that are more than 20 miles apart. Sound business practices also dictate that greater geographic diversity be used to store important data.

FIG. 2 illustrates data storage system 200 in an example of the prior art. Data storage system 200 includes customer system 201, Storage Area Network (SAN) switch 202, and remote storage system 203. Customer system 201 and SAN switch 202 are located at customer premises 204. Customer system 201 transfers blocks of data to SAN switch 202 over communication link 211. Each block of data is an amount of data that typically includes multiple data files. SAN switch 202 transfers the blocks of data to remote storage system 203 over communication link 212, where remote storage system 203 stores the blocks of data. Customer system 201 and remote storage system 203 each maintain a version of the data files, so two versions of the data files are maintained at different locations.

Communication links 211-212 could use various communication protocols, such as Small Computer System Interface (SCSI), Fibre Channel (FC), Internet Protocol (IP), bonded Time Division Multiplex (TDM), and Ethernet. Bonded TDM connections utilize special framing interfaces that provide popular interfaces on the customer side and high-bandwidth communications on the network side over unbundled network elements, such as DS1, DS3, OC3, and OC12 connections.

SAN switch 202 handles the receipt and transfer of data files on a block-by-block basis—which is not real-time. Since SAN switch 202 periodically assembles and transfers blocks of data, SAN switch provides synchronous data storage and not asynchronous data storage. For example, a given data file that is received is not transferred in real-time, but rather, may wait for an hour or more before additional files for the block are received or before its block is scheduled for transfer. Many SAN switches provide scheduled night-time back-up of the day's data files through block transfers.

In addition, SAN switch 202 does not determine the file type of each data file. SAN switch 202 does not transfer the data files based on the specific file type of the individual data file.

Because of SAN switch 202, the distance restriction of data storage system 100 is not present in data storage system 200. Unfortunately, SAN switch 202 can be very expensive. In addition, SAN switch 202 uses block transfers that are synchronous and not on a file-by-file basis in real time.

SUMMARY OF THE INVENTION

Examples of the invention include a data storage system and its method of operation. The data storage system comprises a first storage system, a second storage system, a third storage system, a bonded time division multiplex connection, and an internet protocol connection. The first storage system is at a customer premises and is configured to receive individual data files from a customer system, and on an individual file-by-file basis substantially in real time from receiving each of the individual data files, to determine individual file types for the individual data files and transfer the individual data files based on the individual file types determined for the individual data files. The second storage system is configured to receive and store the individual data files on the individual file-by-file basis, and to subsequently form blocks of data including the individual data files, and transfer the blocks of data. The third storage system is configured to receive and store the blocks of data to store the individual data files. The bonded time division multiplex connection is configured to transfer the individual data files from the first storage system to the second storage system on the individual file-by-file basis. The internet protocol connection is configured to transfer the blocks of data from the second storage system to the third storage system.

BRIEF DESCRIPTION OF THE DRAWINGS

The same reference number represents the same element on all drawings.

DETAILED DESCRIPTION OF THE PREFERRED EMBODIMENT

Figure 1:
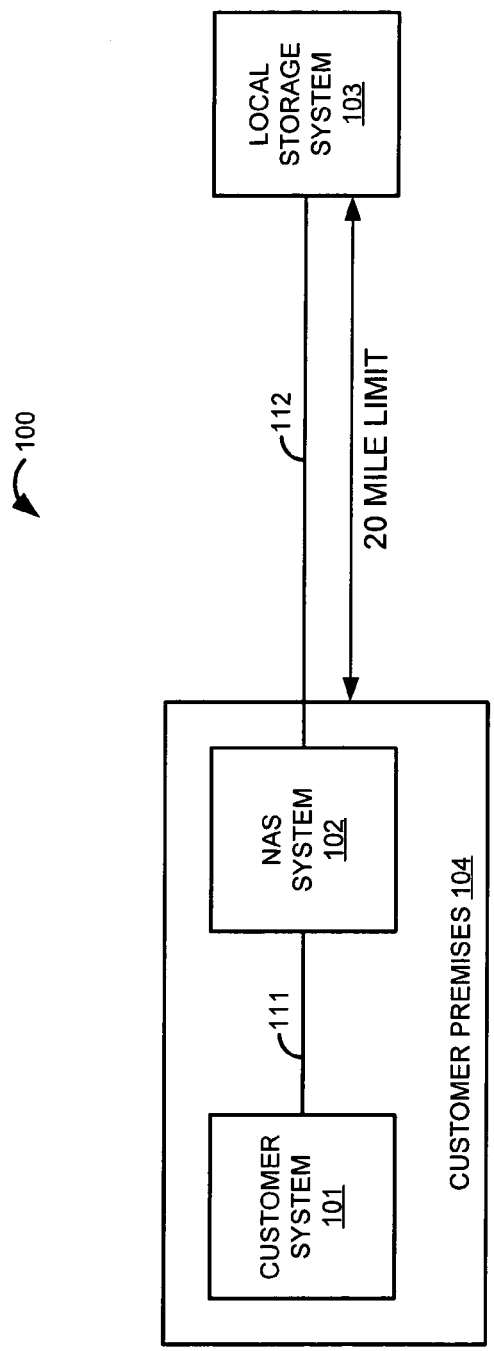
FIG. 1 illustrates a data storage system in an example of the prior art.
Figure 2:
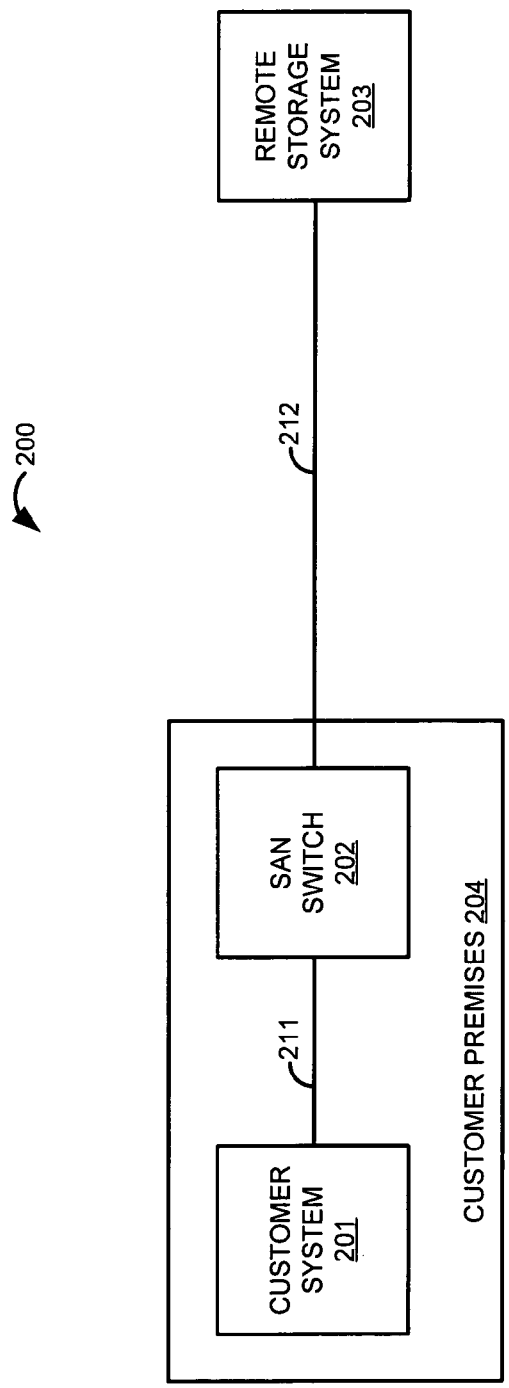
FIG. 2 illustrates a data storage system in an example of the prior art.
Figure 3:
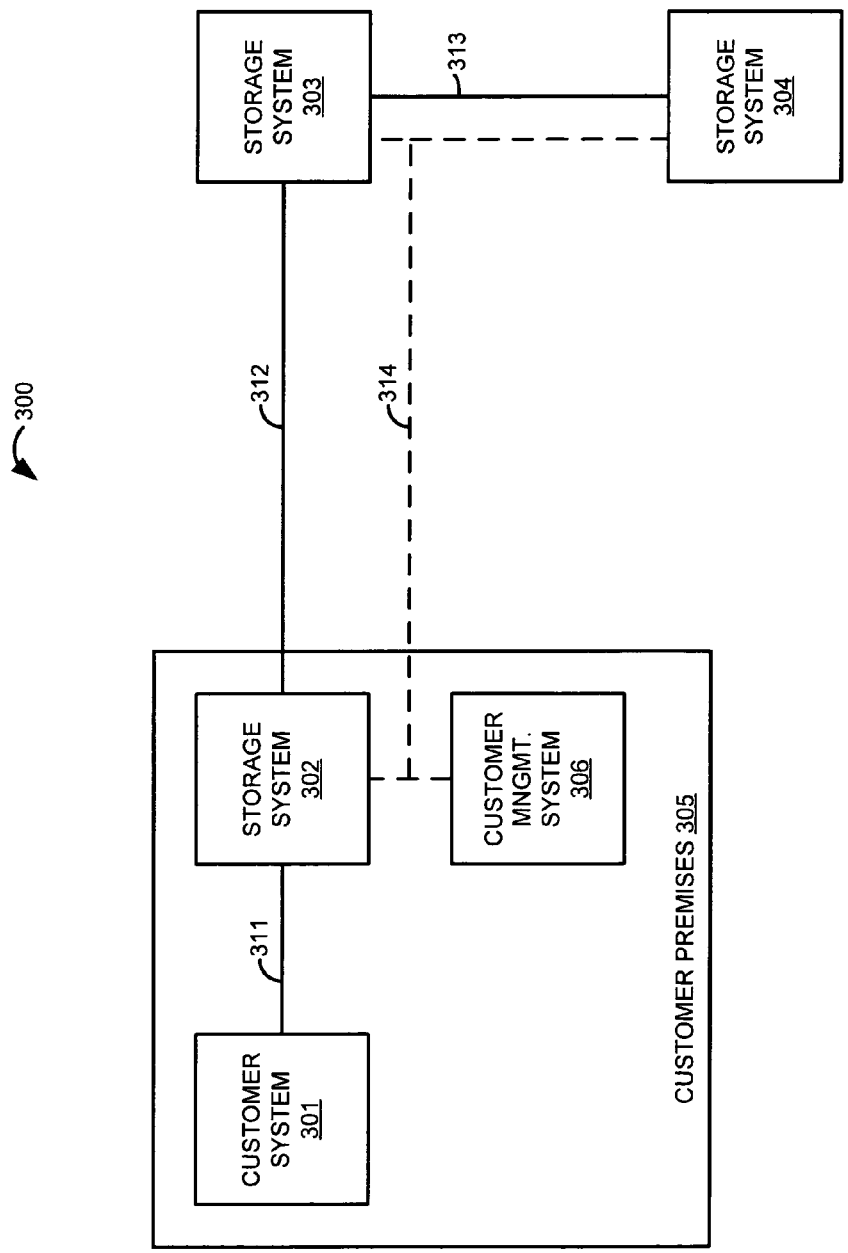
FIG. 3 illustrates a data storage system in an example of the invention.
Figure 4:
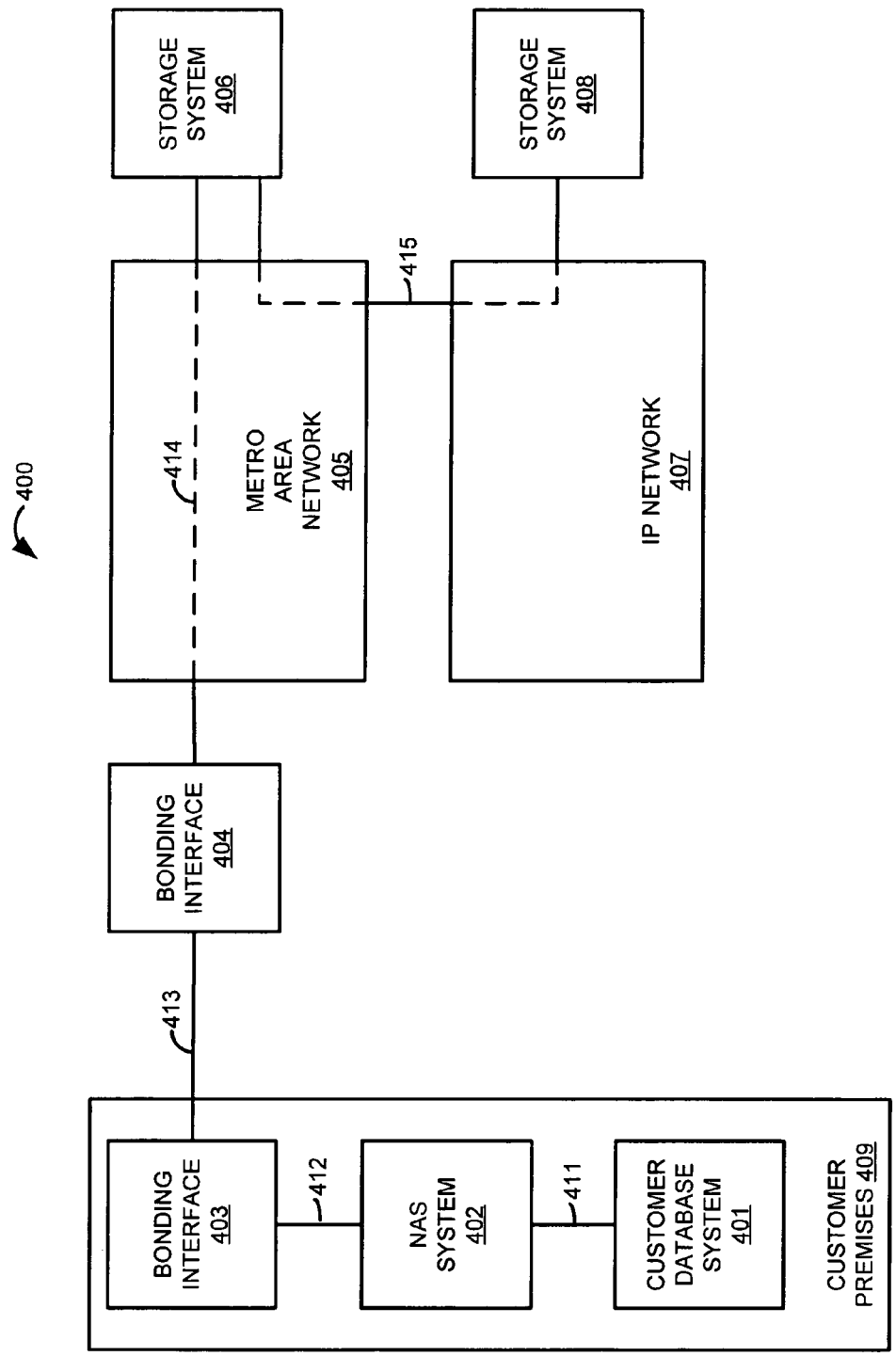
FIG. 4 illustrates a data storage system in an example of the invention.

FIGS. 3-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #2

FIG. 3 illustrates data storage system 300 in an example of the invention. Data storage system 300 includes customer system 301, storage system 302, storage system 303, and storage system 304. Customer system 301 and storage system 302 are located at customer premises 305. Customer system 301 transfers individual data files to storage system 302 over communication link 311.

Storage system 302 receives the individual data files from customer system 301. On an individual file-by-file basis substantially in real time from receiving each of the individual data files, storage system 302 determines individual file types for the individual data files and transfers the individual data files to storage system 303 over communication link 312 based on the individual file types determined for the individual data files. Substantially in real time means that data files are handled and transferred as they are received given the typical processing latency of an asynchronous file-handling system, such as an NAS system. Note that storage system 302 transfers the individual data files to storage system 303 on an individual file-by-file basis and not on a block-by-block basis.

Storage system 303 receives and stores the individual data files on an individual file-by-file basis. Subsequently, storage system 303 forms blocks of data including the individual data files. Storage system 303 transfers the blocks of data to storage system 304 over link 313. Storage system 304 receives and stores the blocks of data to store the individual data files.

Storage system 303 could be less than 20 miles or less than 50 miles from customer premises 305 and provide business continuity for the individual data files. Storage system 304 could be greater than 50 miles or greater than 200 miles from customer premises 305 and provide disaster recovery for the individual data files. If desired, storage system 304 could be thousands of miles away from customer premises 305.

Customer system 301 maintains a first version of the individual data files, storage system 303 maintains a second version of the individual data files, and storage system 304 maintains a third version of the individual data files. Thus, three versions of the individual data files are simultaneously maintained at three geographically diverse locations. Advantageously, one of these versions can be hundreds or thousands of miles away from the other two versions.

Communication link 311 could be a bonded Time Division Multiplex (TDM) connection that transfers the individual data files from the storage system 302 to storage system 303 on an individual file-by-file basis. Communication link 312 could be an internet protocol connection that transfers the blocks of data from the storage system 303 to storage system 304. Storage system 302 could be a NAS system, and may not include a SAN switch. Storage system 303 could include a NAS system and a SAN switch.

Data storage system 300 also includes customer management system 306 at customer premises 305. Customer management system 306 is linked to storage systems 302-304 over communication links 314. Communication links 314 could utilize the Internet. Customer management system 306 could be an appropriately programmed computer system.

Customer management system 306 receives customer instructions. In response to the customer instructions, customer management system 306 modifies that data storage capacity for the customer at the storage system 303 and storage system 304. In response to the customer instructions, customer management system 306 modifies the communications capacity for the customer on the communication links 312-313.

For example, a customer could log-on to customer management system 306 and add to the storage capacity that they pay for in storage systems 303-304. Likewise, the customer could also add to the bandwidth that they pay for through links 312-313. To implement the customer instructions, customer management system 306 would issue the appropriate commands over link 314 to control interfaces at storage systems 303-304. The control interfaces would then initiate the modifications through the communications and storage equipment at storage systems 303-304.

Because storage systems 302 and 303 handle the data files individually in real time, customer management system can be used to provide file-by-file handling instructions. These instructions could control the priority a given data file has to access block transfer to storage system 304. Important data files that are received by storage system 303 may be tagged for immediate transfer in the next block to provide near real-time data file transfer to distant storage system 304.

Example #2

FIG. 4 illustrates data storage system 400 in an example of the invention. Data storage system 400 includes customer database system 401, NAS system 402, bonding TDM interfaces 403-404, Metropolitan Area Network (MAN) 405, storage system 406, IP network 407, and storage system 408. Customer database system 401, NAS system 402, and bonding TDM interface 403 are located at customer premises 409.

Customer database system 401 is coupled to NAS system 402 by SCSI link 411. NAS system is connected to bonding TDM interface 403 by Fibre Channel link 412. Bonding TDM interface 403 is coupled to bonding TDM interface 404 by bonded TDM connection 413. Bonded TDM interface 404 is coupled to storage system. 406 over optical link 414 through MAN 405. Storage system 406 is linked to storage system 408 over IP link 415 through MAN 405 and IP network 407. Optical link 414 could comprise Ethernet over Synchronous Optical Network (SONET) over Wave Division Multiplexing (WDM). IP link 415 could comprise an IP tunnel over SONET over WDM. IP link 415 could be distributed over multiple physical paths through various IP routers.

In operation, customer database system 401 executes a database application that along with the file type places a severe latency restriction on data file transfer. This latency restriction effectively restricts the distance between NAS system 402 and storage system 406 to approximately 20 miles.

NAS system 402 receives individual data files from customer database system 401. On an individual file-by-file basis substantially in real time from receiving each of the individual data files, NAS system 402 determines individual file types for the individual data files and transfers the individual data files to storage system 406 based on the individual file types determined for the individual data files. This file-by-file data transfer occurs through link 412, bonded TDM interface 403, bonded TDM link 413, bonded TDM interface 404, and optical link 414 through MAN 405.

Storage system 406 receives and stores the individual data files on an individual file-by-file basis. Subsequently, storage system 406 forms blocks of data including the individual data files. Storage system 406 could include communication and SAN equipment including NAS and SAN switching. Storage system 406 transfers the blocks of data to storage system 408 over IP link 415 through MAN 405 and IP network 407. Data transfer between storage systems 406 and 408 over IP link 415 is encrypted. Storage system 408 receives and stores the blocks of data to store the individual data files. Storage system 408 could be hundreds or thousands of miles away from storage system 406.

ADVANTAGES

When suitably implemented, a data storage system in accord with the present invention helps provide the several advantages. The inventive data storage system does not require that the customer install an expensive SAN switch at their customer premises. Many customers can share these storage systems and communication networks to provide cost efficiency through economy of scale. The customer obtains file-by-file back-up to an off-site location in real-time. The customer also obtains geographically diverse file back-up on the order of hundreds or thousands of miles.

The invention claimed is:

1. A data storage system comprising:
   a first storage system at a customer premises that is configured to receive individual data files from a customer system, and on an individual file-by-file basis substantially in real time from receiving each of the individual data files, to determine individual file types for the individual data files and transfer the individual data files based on the individual file types determined for the individual data files;
   a second storage system configured to receive and store the individual data files on the individual file-by-file basis, and to subsequently form blocks of data including the individual data files, and transfer the blocks of data;
   a third storage system configured to receive and store the blocks of data to store the individual data files;
   a bonded time division multiplex connection configured to transfer the individual data files from the first storage system to the second storage system on the individual file-by-file basis;
   a first internet protocol connection configured to transfer the blocks of data from the second storage system to the third storage system; and
   a customer management system at the customer premises that is linked to the second and third storage systems by a second internet protocol connection and that is configured to receive first instructions from a customer associated with the customer premises, and in response, to instruct the second and third storage systems to increase data storage capacity for the customer premises and to instruct the second storage system to increase communications capacity for the customer premises on the bonded time division multiplex connection and the third storage system to increase communication capacity for the customer premises on the first internet protocol connection.

2. The data storage system of claim 1 wherein the customer system is configured to maintain a first version of the individual data files, the second storage system is configured to maintain a second version of the individual data files, and the third storage system is configured to maintain a third version of the individual data files, so that three versions of the individual data files are simultaneously maintained at three geographically diverse locations.

3. The data storage system of claim 1 wherein the second storage system is less than 20 miles from the customer premises.

4. The data storage system of claim 1 wherein the second storage system is less than 50 miles from the customer premises.

5. The data storage system of claim 1 wherein the third storage system is greater than 50 miles from the customer premises.

6. The data storage system of claim 1 wherein the third storage system is greater than 200 miles from the customer premises.

7. The data storage system of claim 1 wherein in response to the first instructions from the customer, the customer management system is configured to instruct the second and third storage systems to decrease data storage capacity for the customer premises and to instruct the bonded time division multiplex connection and the first internet protocol connection to decrease communications capacity for the customer premises.

8. The data storage system of claim 1 wherein the customer management system at the customer premises is further configured to receive second instructions from the customer, and in response, to assign priorities to the individual data files and to transfer between the second storage system and the third storage system an individual data file that has an immediate transfer priority.

9. The data storage system of claim 1 wherein the first storage system is a Network Attached Storage (NAS) system and is not a Storage Area Network (SAN) switch.

10. The data storage system of claim 1 wherein the first storage system transfers the individual data files to the second storage system on the individual file-by-file basis and not on a block-by-block basis.

11. A method of operating a data storage system, the method comprising:
    in a first storage system at a customer premises, receiving individual data files from a customer system, and on an individual file-by-file basis in substantially real time from receiving each of the individual data files, determining individual file types for the individual data files and transferring the individual data files based on the individual file types determined for the individual data files over a bonded time division multiplex connection;
    in a second storage system, receiving and storing the individual data files on the individual file-by-file basis, and subsequently forming blocks of data including the individual data files, and transferring the blocks of data over an internet protocol connection;
    in a third storage system, receiving and storing the blocks of data to store the individual data files; and
    in a customer management system at the customer premises, receiving first instructions from a customer associated with the customer premises and, in response, instructing the second and third storage systems to increase data storage capacity for the customer premises and instructing the second storage systems to increase communications capacity for the customer premises on the bonded time division multiplex connection and the third storage system to increase communication capacity for the customer premises on the first internet protocol connection, wherein the customer management system is linked to the second and third storage systems by a second internet protocol connection.

12. The method of claim 11 wherein the customer system maintains a first version of the individual data files, wherein storing the individual data files in the second storage system comprises maintaining a second version of the individual data files, and wherein storing the individual data files in the third storage system comprises maintaining a third version of the individual data files, so that three versions of the individual data files are simultaneously maintained at three geographically diverse locations.

13. The method of claim 11 wherein the second storage system is less than 20 miles from the customer premises.

14. The method of claim 11 wherein the second storage system is less than 50 miles from the customer premises.

15. The method of claim 11 wherein the third storage system is greater than 50 miles from the customer premises.

16. The method of claim 11 wherein the third storage system is greater than 200 miles from the customer premises.

17. The method of claim 11 wherein the customer management system, in response to the first instructions from the customer, further comprises instructing the second and third storage systems to decrease data storage capacity for the customer premises and instructing the bonded time division multiplex connection and the first internet protocol connection to decrease communications capacity for the customer premises.

18. The method of claim 11 wherein the customer management system at the customer premises further comprises receiving second instructions from the customer, and in response, assigning priorities to the individual data files and transferring between the second storage system and the third storage system an individual data file that has an immediate transfer priority.

19. The method of claim 11 wherein the first storage system is a Network Attached Storage (NAS) system and is not a Storage Area Network (SAN) switch.

20. The method of claim 11 wherein the first storage system transfers the individual data files to the second storage system on the individual file-by-file basis and not on a block-by-block basis.

* * * * *